United States Patent
Rosen et al.

(10) Patent No.: US 6,560,512 B1
(45) Date of Patent: May 6, 2003

(54) RELATIONAL ROBOTIC CONTROLLER

(75) Inventors: David Rosen, Tarzana, CA (US); Alan Rosen, Redondo Beach, CA (US)

(73) Assignee: Machine Consciousness, Inc., Redondo Beach, CA (US)

( * ) Notice: Subject to any disclaimer, the term of this patent is extended or adjusted under 35 U.S.C. 154(b) by 0 days.

(21) Appl. No.: 10/041,713

(22) Filed: Jan. 4, 2002

(51) Int. Cl.[7] .......................... G05B 15/00; G05B 19/00
(52) U.S. Cl. ..................... 700/258; 700/245; 700/259; 700/262; 714/4; 701/23
(58) Field of Search ................................ 700/245, 258, 700/259, 262; 714/45, 797, 10, 15, 4, 12; 709/100, 102, 248, 310; 435/320.1; 701/23

(56) References Cited

U.S. PATENT DOCUMENTS

| | | | |
|---|---|---|---|
| 4,805,107 A | * 2/1989 | Kieckhafer et al. | 714/4 |
| 4,816,989 A | * 3/1989 | Finn et al. | 709/248 |
| 4,914,657 A | * 4/1990 | Walter et al. | 714/4 |
| 4,933,490 A | * 6/1990 | Iannella | 562/401 |
| 4,972,415 A | * 11/1990 | Walter et al. | 714/797 |
| 4,980,857 A | * 12/1990 | Walter et al. | 714/45 |

OTHER PUBLICATIONS

Koca et al., Turbe space–time equalization of TCM with receiver diversity I: Symbol–by–symbol detection, 2000, IEEE, pp. 552–556.*

Frenkel et al., A dedicated DSP computation engine baased on VLSI vector signal processors, IEEE, 1989, pp. 2564–2568.*

Grenier, Wideband source location through frequency–dependent modeling, 1994, IEEE, pp. 1087–1096.*

Shinnaka, Proposition of new mathematical models with core loss factor for controlling AC motors, 1998, IEEE, pp. 297–302.*

* cited by examiner

*Primary Examiner*—William A. Cuchlinski, Jr.
*Assistant Examiner*—McDieunel Marc
(74) *Attorney, Agent, or Firm*—Swernofsky Law Group PC

(57) ABSTRACT

The relational robotic controller (RRC) is a robotic control devise made up of a stack of relational correlation sequencers (RCS). The RRC controls the tasks (including sound generation, memory storage and retrieval tasks) performed by a robot. The RRC is programmed to perform all tasks relative a self location and identification task, performed by a nodal map, known as the self nodal map, and associated with one of the RCS that make up the RRC. The self-nodal map, operating simultaneously while other nodal maps are performing other tasks, acts as a recording monitor that senses data from pressure transducers, cameras, and microphones, relative to the self of the robot. When a phoneme-sound generating, auditory-microphone, and memory storage and retrieval RCS capability is coupled with a visual-camera capability, a RRC controlled robot may be trained to achieve coordinated camera visualization, memory recall, and verbal communication.

48 Claims, 4 Drawing Sheets

The Preferred Embodiment Relational Robotic Controller. System 100

Figure 1. The Preferred Embodiment Relational Robotic Controller. System 100

Figure 2. Flow chart explaining the traininng of the Relational Robotic Controller Method 200

FIGURE 3 Hierarchical Task diagram for displacement tasks

FIG. 4

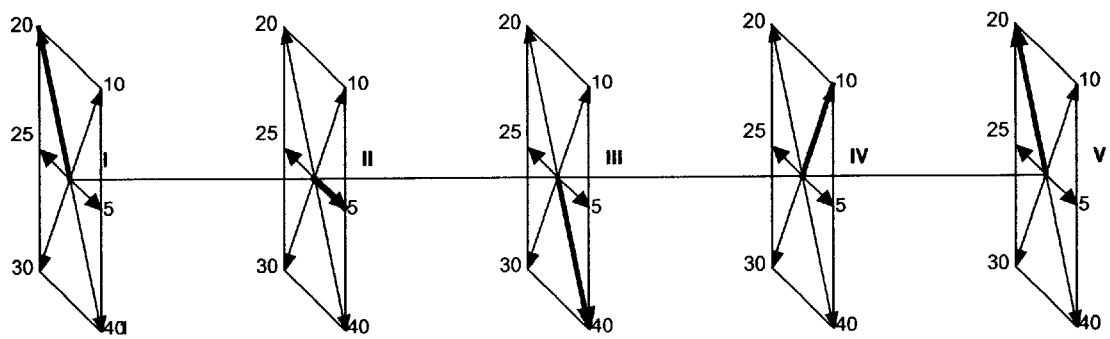

Figure 4
A sequence of nodal transitions in the pq space where the p field is the sound generating control vector signals and the q field is the phoneme sound signals received by the set of microphone (diaphrams) adjoining the tactile pressure transducers.

Figure 5
A sample representation of the navigational nodal path, through a 40 dimensional pq space, for a word sound composed of 5 phonemes.

FIG. 5

RELATIONAL ROBOTIC CONTROLLER

BACKGROUND OF THE INVENTION

1. Field of the Invention

This invention relates to selection of "cause" vector signals. The "cause" vector signals govern motors that control robotic limbs, optical sensors and audio generators and are used in navigating a robot through an "effect" vector space.

2. Related Art

A relational correlation sequencer includes a nodal map module and a sequence stepper module. Taken together, these modules generate (1) a nodal map and (2) a set of sequences for the control of one set of signals (denoted herein as p signals) based upon sequences of a second set of signals (denoted herein as q signals).

The nodal map shows a relationship between two sets of signals, wherein each set of signals is represented by a multi-dimensional vector field. The two multidimensional vector fields consist of a set of cause or control vectors (p vectors) and effect or sensor derived vectors (q vectors). Transitions in the nodal space are used to mirror transitions in a Euclidean or function space, and the control signals that cause such transitions. For example, a transition in the nodal map may represent a physical displacement in space and the control vector that causes such a displacement. The dimensionality of the nodal space may include one, two, three, four or more dimensions, preferably expressed as a mathematical construct in the form of a Kohonen self-organizing map.

The sequence stepper module generates a temporal relationship between the pq vector pairs. A sequence of specific pq vector pairs is generated by navigating through the nodal space, traversing the set of adjacent nodal points that define the sequence of pq vectors. Thus, given an initial nodal point defining a pq where t=0, and a final nodal point defining a q where t=n, the sequence stepper module will form a temporal sequence of pq that is defined by a navigational path between the initial nodal point and the final nodal point.

These relational correlation sequencers can be coupled together to form a hierarchy wherein each sequencer is responsible for a particular set of motors in a robot. For example, a first relational correlation sequencer may control movement of a robotic arm while a second relational correlation sequencer controls movement of robotic legs.

SUMMARY OF THE INVENTION

Numerous desired advantages can result from using multiple relational correlation sequences. For example, a relational correlation sequencer can store and receive data, thereby providing information that can be used to perform tasks on the basis of stored data, rather than data that is received in real time. Furthermore, a hierarchical set of relational correlation sequencers associated with a particular task can be used to "train" a robot to simultaneously perform other tasks that are related to the particular task. Lastly, a hierarchy of relational robotic correlation sequencers can provide memory and various sensory abilities that loosely emulate biological functions.

In a first aspect of the invention, a robotic device (and associated nodal map) is trained to perform a first task (for example, a task A) that involves a self location and identification task. For example, task A may involve moving a robotic finger so as to locate one or more pressure transducers used as tactile sensors that are uniformly distributed about the robotic body. On the basis of information relating to task A, the robotic device can learn to perform tasks B, C, D and others that relate to task A. In a preferred embodiment, this second set of tasks may involve inputs from different sensors (such as cameras mounted on a movable platform, sonar or radar sensors, auditory sensors, thermal sensors and so on) that are used to provide information to the device useful for the performance of the second set of tasks.

The combination of external sensory data and internal data enable the robot to operate in real time. The external sensory data is provided by the various sensors assigned to the robot. The internal data includes information such as the current flow and voltage associated with the motors and sensory systems, the charge in one or more batteries, the lubrication of moving parts and other information such as may reflect the internal state of the robot.

In a second aspect of the invention, a set of relational correlation sequencers may operate as a memory storage device that allows the robot to operate as a function of stored data, rather than real time internal and external data. For example, a correlation sequencer may be used to store all the data present in a street map. This data may be combined with other data inputs (for example, from one or more optical sensors) so as to provide intelligent navigation.

In a third aspect of the invention, a set of relational correlation sequencers add an auditory sound generating capability to the relational robotic controller.

BRIEF DESCRIPTION OF THE DRAWINGS

FIG. 4 shows a sequence of nodal transitions relating to the generation of sound.

FIG. 5 shows an exemplary representation of a nodal path representing five different phonemes.

DETAILED DESCRIPTION OF THE PREFERRED EMBODIMENT

Figure 1:
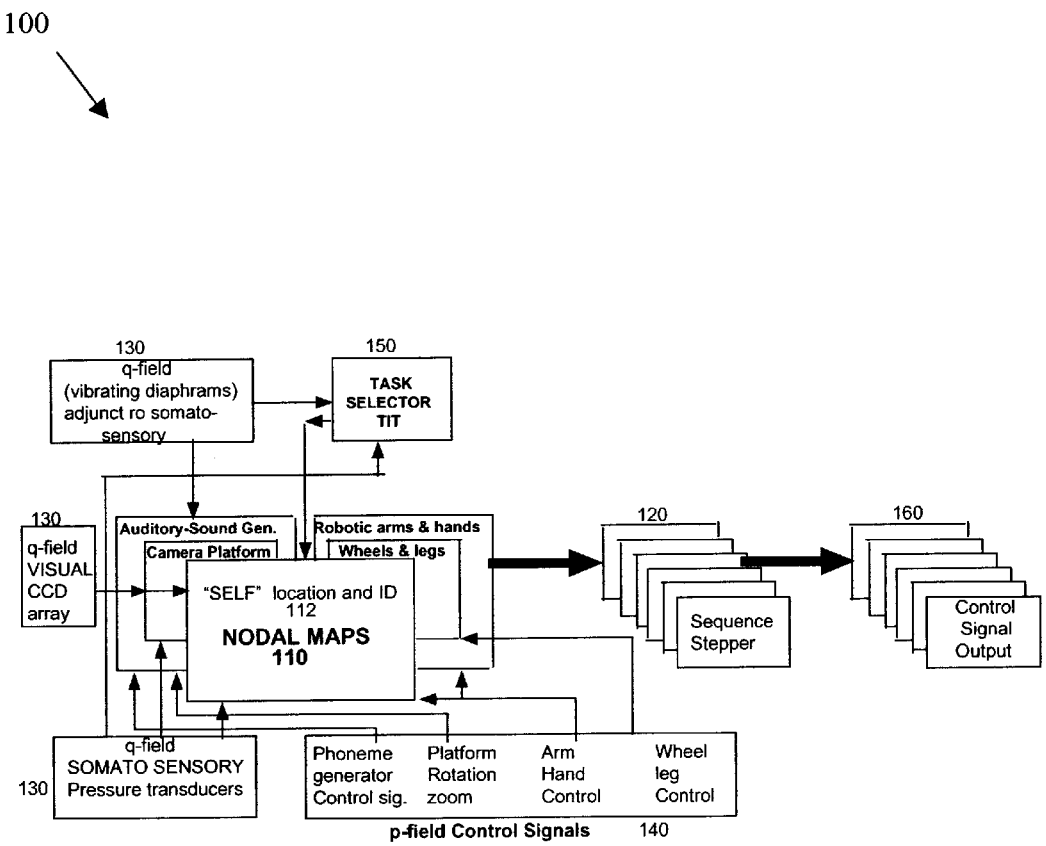
FIG. 1 shows a block diagram of a robotic control module.

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Related Applications

Inventions described herein can be used in conjunction with inventions described in the following document:

Ser. No. 09/761,960, titled "Relational Correlation Sequencer", filed on Jan. 17, 2001 in the names of David Rosen and Alan Rosen.

This document is hereby incorporated by reference as if fully set forth herein and is referred to herein as the "Incorporated Disclosure."

Lexicography

The following terms refer or relate to aspects of the invention as described below. The descriptions of general meanings of these terms are not intended to be limiting, only illustrative.

Cause Vector—as used herein, a "cause vector" includes those control signals (such as inputs to a motor control) that are used to cause spatial transitions, adjust optical or other sensors, and generate sound. Generally, cause vectors are related to actions taken by the robot.

Effect vector—as used herein, "effect vectors" are signals received from a set of sensors used to monitor the external and internal environment of the robot. The external environment is received by an array of pressure transducers, pick-up microphones, optical devices and other sensors that are incorporated into the robotic system. The internal sensors receive internal data such as the current flow and voltage associated with the motors and sensory systems, the charge in one or more batteries, the lubrication of moving parts and other information that reflect the internal state of the robot. In the preferred embodiment, the effect vectors frame rate is generally determined by the frame rate of the visual video q field data. A specific effect vector defines a destination node associated with a particular task initiating trigger.

Nodal Map—as used herein, a "nodal map" is a correlation network that maps a relationship between a set of cause vectors (denoted herein as p vectors) and a set of effect vectors (denoted herein as q vectors). The configuration of the nodal map may be in the form of a multi-dimensional Euclidean space, or a multi-dimensional function space of any dimensionality whatsoever, as long as neighboring nodal points in that space are assigned to adjacent positions along the coordinates of the space. Each node in the nodal map is assigned a specific set of multi-dimensional pq vector pairs, which may be expressed in tabular form, with one pq table assigned to each node.

Sequence stepper—as used herein, a "sequence stepper" is an element of the relational correlation sequencer. The sequence stepper determines a sequence of steps for navigating through a set of adjacent nodal points that define a sequence of pq vectors from an initial effects vector to a destination effects vector.

Frame Rate & Frame Period—as used herein, the "frame rate" refers to the operational speed of the relational robotic controller (RRC); "frame period" refers to the time duration of each frame. The control signal output rate of the RRC is limited to a maximum of one p vector control signal leading to a traversal to an adjacent node, per frame period. Whereas, the sequence stepper generates a long sequence of control signals during each frame period that "plans" a navigational path to a destination node, only one motor control p signal is generated by the control signal output during each frame period. (The RRC does "end point planning" at each step of its motion.)

Task selector—as used herein, the "task selector" is trained to select a particular effect vector from all q effect vectors that are applied to the robot at the frame rate. The particular set of effects vectors, selected by the task selector arc used as task initiating triggers. Each task initiating trigger is based upon internal or external q field inputs.

Task Initiating Trigger—as used herein, a "task initiating trigger" (TIT) includes the particular set of effects vectors that are identified by the task selector. Generally, a TIT consists of two nodes, a q final node and a q initial node. Those two nodes are used by the sequence stepper to determine a sequence of p type control signals that move the robot from its initial nodal location (q initial) to the final nodal location (q final).

Relational Correlation Sequencer—as used herein, a "relational correlation sequencer" include a nodal map and a sequence stepper that work together to select the motor control cause signals that result in navigating a robot through a nodal space to a desired location. More than one relational correlation sequencer can be hierarchically arranged or stacked, so as to achieve an increasingly complex result.

Self location and identification nodal map—as used herein, a "self location and identification nodal map" refers to a nodal map within a relational correlation sequencer, that has been trained to navigate one movable part of the robot towards any and all other parts by use of the tactile sensor effect vectors (pressure transducers). This is also referred to as "the self nodal map".

Line Dance—as used herein, a "line dance" is a preprogrammed sequence of cause vectors that are used repeatedly. Line dances are particular useful in the development of tools for performing useful actions associated with those sequences.

Daisy chains—as used herein, a "daisy chain" includes a repetitive array including a large number of simple sequences.

Pavlovian programming techniques—as used herein, a "pavlovian programming technique" includes a technique for programming the invention to convert a temporally adjacent q field that is present near a q TIT, into a new TIT operating independently of the q TIT. In this way, the robot "learns" to initiate tasks with new triggers that are associated with the original q TIT.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 includes a block diagram of a relational robotic controller system.

An RRC system 100 includes a hierarchical arrangement of relational correlation sequencers and a task selector 150. Each relational correlation sequencer includes a nodal map 110, a set of sequence steppers 120, a set of sensors signal inputs 130, and a set of control signals 140.

The set of nodal maps 110 includes a "self" nodal map 112 which provides a robot with information as to its location, orientation and identification. The self nodal map 112 represents the primary task of the robot; other nodal maps 110 represent tasks that are performed relative to the primary task. Each nodal map 110 (including the self nodal map 112) is a correlation network that maps a relationship between a set of p vectors and a set of q vectors. Each node in the nodal map 110 is associated with a p cause vector and a q vector. Nominal values are set for the cause vectors. Values associated with the effect vectors are related to sensor data. Each node in the map is associated with a table expressing these values.

The self nodal map 112 is initially trained with somatosensory (tactile) q field data. In the preferred embodiment, the self nodal map 112 is used as a recording monitor for the robot. The self nodal map 112 is related to all q fields of maps 110. For example, the q visual field of map 110 may be recorded at the same nodal location as q tactile fields of map 112. In this way, a robot can simultaneously integrate visual data with tactile data and thereby monitor the visual data with respect to the tactile data.

In a preferred embodiment, one or more of the nodal maps 110 can also be used as a memory storage device and the sequence stepper 120 may be used as a stored data retrieval system. For example, a nodal map of a correlation sequencer may be used to store digital map data. This information can be retrieved by the sequence stepper and used to provide navigational paths within the digitally stored map, for a robot.

In a digitally stored map, the nodal map 110 is preferably a 2 dimensional surface array located on an orthogonal xy coordinate system, rather than a reflection of the 3 dimensional space in which the robot is operating. The intersection points of the xy grid define the nodes that bear a one-to-one correspondence with the q values associated with the corresponding grid on the 2 dimensional nodal map 110. In such nodal maps, p vectors include transition signals to adjacent nodes and q values reflect the desirability of particular transitions at that node. For example, a q value might include information about obstacles and their relative penetrability, taken from the digital map data.

An example of a pq table assigned to one node of a 2 dimensional nodal array, used in a correlation sequencer for navigating within a digitally stored map is shown in table 1. This table shows 3 levels of penetrability and 8 possible p value transitions that can be made. Information stored in this node can be used in conjunction with information stored in other nodes. q field data is used to eliminate transitions that are undesirable. A robot can retrieve this data to determine how to navigate from a starting point to a designation point.

| q (initial) | q (initial) level | q (final) | q (final) level |
|---|---|---|---|
| [4,3] | Up (N) | [4,4] | 2 |
| | Diagonal (NW) | [3,4] | 2 |
| | Side (W) | [3,3] | 1 |
| | Diagonal (SW) | [3,2] | 2 |
| | Down (S) | [4,2] | 2 |
| | Diagonal (SE) | [5,2] | 1 |
| | Side (E) | [5,3] | 1 |
| | Diagonal (NE) | [5,3] | 3 |

Table 1 shows an example of a p q table assigned to one node of a 2 dimensional nodal array. The table includes the initial nodal location (q initial=[4,3]) and the set of pq values assigned to nodes adjacent to the initial node.

In addition to storing and providing information, nodal maps 110 can be trained to make associations. The associative programming technique is called pavlovian programming. Pavlovian programming is used to program an RRC to associate each q-TIT with the temporally adjacent q-field that was present near the q-TIT. The temporally adjacent q field becomes an additional TIT, generated by the task selector 150 for a task that may either be identical or different from the original q-TIT generated task.

The set of sequence steppers 120 are coupled to the nodal maps 110. During each frame period, each sequence stepper 120 forms a temporal relationship between the pq vector pairs and determines a sequence of steps for reaching an effect vector based upon current position and various cause vectors. For example, given an initial input pq (t=0) and a final input (t=n), the sequence stepper 120 forms a temporal sequence of pq such that each transition from pq (t=i) to pq (t=i+1) takes place between adjacent nodes, and the total pq sequence is formed by the navigational path from the initial node at pq (t=0) to the final node pq (t=n). The control signal output 160 receives the total sequence of control signals during each frame period. However, only one p signal per frame (associated with triggering a transition to an adjacent node) is generated by the control signal output 160.

The maximum speed of traversal of the robot from the initial node to the final node is determined by the frame rate. For example, if an operational speed of 30 frames per second is selected for the robot, the maximum nodal traversal rate is 30 nodes per second. This speed matches the frame rate of a video camera and allows the RRC to process the total data input within $\frac{1}{30}$ of a second. The RRC performs "end point planning" during each frame period. This planning may change any time an obstacle appears along its nodal path.

Various sensors 130 supply input to the nodal maps 110. These sensors may include any of the following: optical scanners, cameras, tactile pressure transducers, "pick-up" microphones, sonar or radar. Other embodiments may include olfactory sensors in which a dry spectrometer generates an olfactory q field and/or gustatory sensors in which a wet spectrometer generates a "taste" q field.

The sensors 130 that provide input concerning the identification, location, and orientation of the robot to the self nodal maps 112 are known as somato-sensory sensors. The somato-sensory sensors are always active so as to enable a robot to be self-monitoring. A threshold that correlates with a stimulus that could potentially damage the robot is preset. The receipt of a signal that exceeds the preset threshold initiates a predetermined set of tasks aimed at protection of the robot.

The initiation or switching of a RRC from one task to another is performed by the task selector 150. The task selector 150 generates a TIT. This TIT is of variable priority and is used to select a real time task to be performed by the robot. TITs arise either from internal or external sensors 130 and the nodal maps 110. During normal operations, the task selector 150 monitors the q field nodal map data and can generate TITs that initiate a sequence of actions from an initial q node to a final q node.

Method of Use

Figure 2:
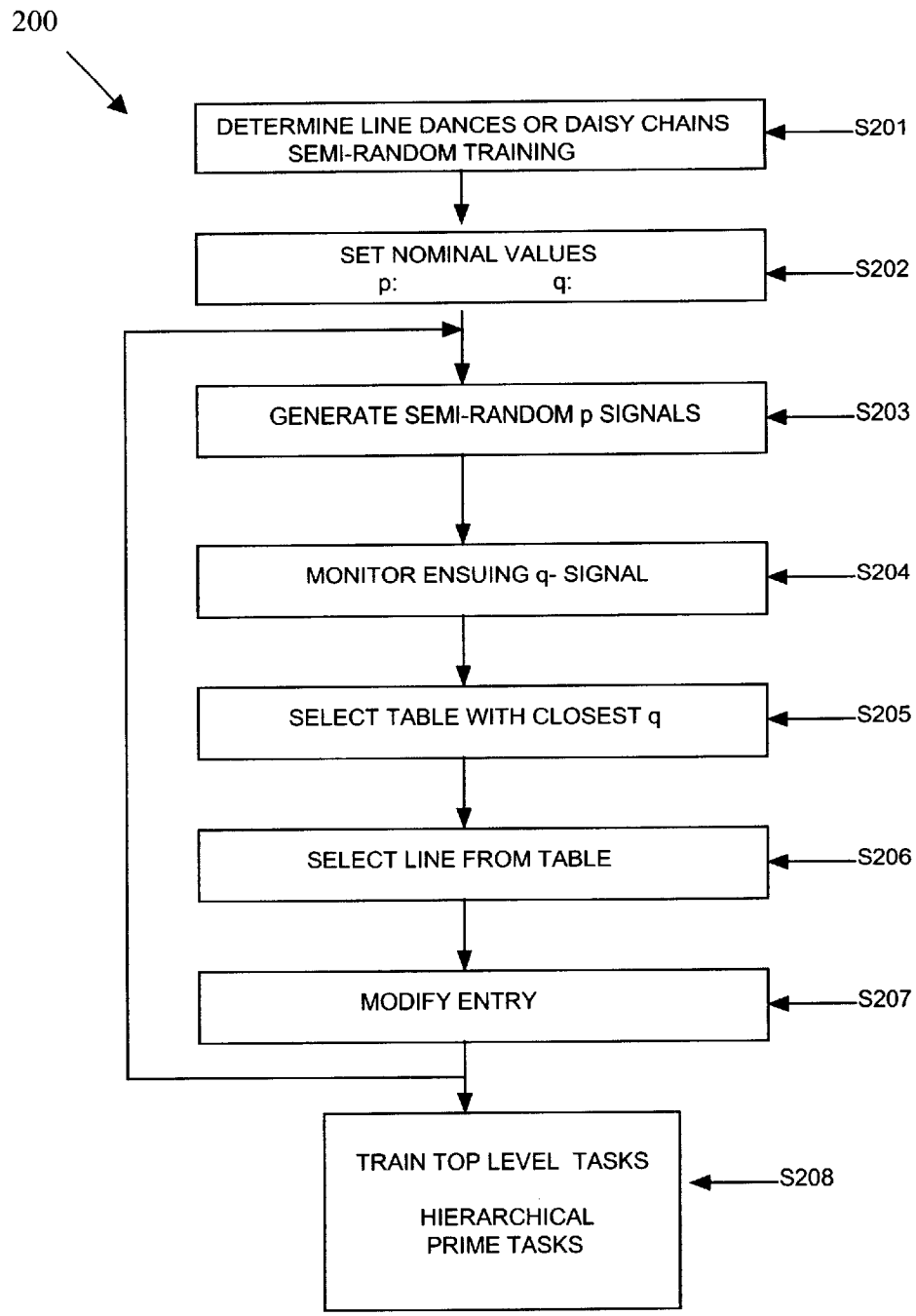
FIG. 2 shows a flow diagram of a method for training the relational robotic controller.

FIG. 2 shows a flow diagram of a general method 200 for training the nodal maps of a relational robotic controller. Each trained nodal map represents a set of tasks that are performed by the RRC.

The RRC is made up of a large number of relational correlation sequencers, and associated nodal maps that must be trained prior to system use. This training method is a 2 step process. First, the relational correlation sequencer nodal maps are trained using simulated q-field data. Second, real time q field data is applied at the frame rate of the system, to initiate TITs and the tasks associated with them.

In the preferred embodiment, the RRC is trained (programmed) to perform all tasks relative to a primary task. This primary task is the self location and identification task performed by a trained self nodal map 112. A trained self nodal map is programmed to perform a set of navigational tasks that teach the robot the location of any peripheral part of the robot with respect to any other part. For example, a robot equipped with thousands of pressure transducers uniformly distributed on the peripheral body of the robot can be trained to navigate a robotic finger located at the end of a robotic arm, so as to "touch" any one of the pressure transducers.

In general, various forms of q field data may be applied to the nodal maps 110 representing tasks performed by the RRC. However, the primary self location and identification nodal mapping 112 is trained with somato-sensory (tactile) q field data. This q field tactile data from one or more pressure transducers is applied to the self location and identification nodal map in a three dimensional mapping that mirrors the Euclidean space about the robot. The array of pressure transducers, distributed uniformly about the robotic body regarded as somato-sensory tactile type sensors, are three primary q-field of the "self" nodal map. The three dimensional nodal mapping mirrors the three dimensional Euclidean space around the robotic body. The nodes associated with the array of pressure transducers mirror the boundary between the robotic "self" and the external environment.

A method 200 is described for the primary task nodal map, as well as tasks performed relative to the primary task. In the training of the primary task of the self nodal map, the pressure transducers, distributed uniformly about the robotic body, provide the q final stimulation data. The method 200 can be performed equally well for other tasks, with other stimulation that provide q final information so that the robot can locate the nodes associated with the q initial and q final data.

A method 200 includes a set of flow points and process steps as described herein. Although by the nature of textual description, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

Figure 3:
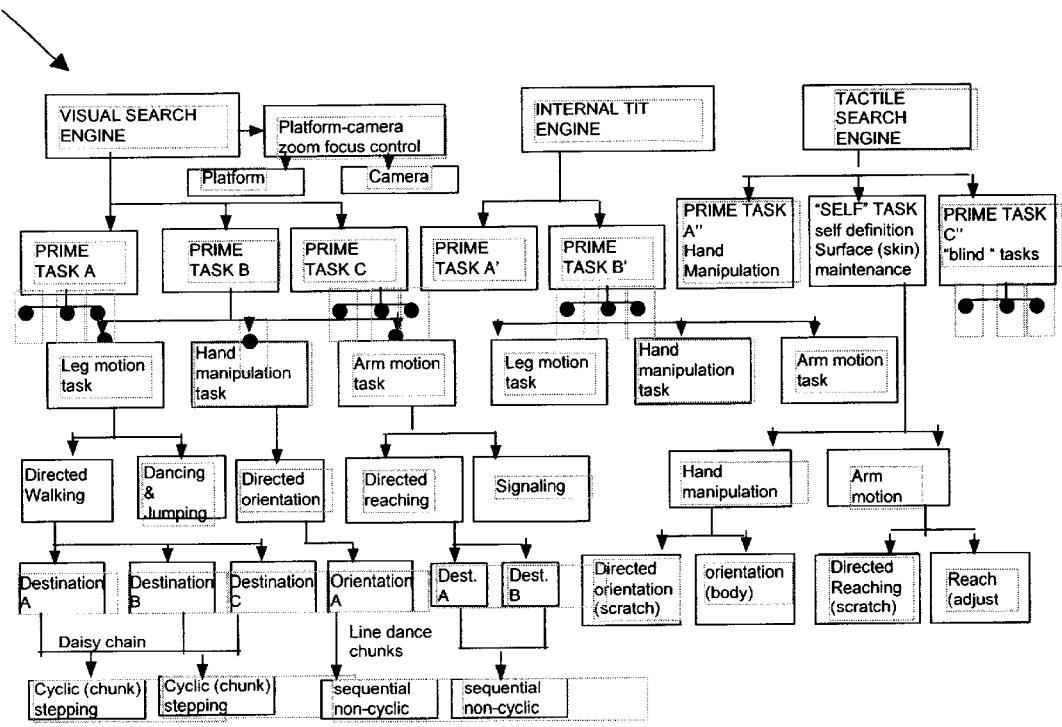
FIG. 3 shows a hierarchical task diagram showing the elements of various tasks.

In a step 201, the system 100 is ready to commence performing a method of training the relational robotic controller with respect to external stimuli. An initial determination is made as to whether there is a "chunked" action and whether that "chunked action" is part of a daisy chain or a line dance. The relative hierarchy of such "chunked" tasks is shown in FIG. 3. During this step, there are no high priority or intermediate task initiating triggers assigned to any of those nodes involved with "chunked" actions.

In a step 202, the total number of p vectors assigned to every node included in a nodal map is trained. For example in a preferred embodiment, the self nodal map uses inputs selected by the task selector and originating from an array of pressure transducers. Any stimulation of the pressure transducer results in a TIT signal input to the self nodal map. For example, a self nodal map includes cause and effect vectors associated with the movement of a robotic "finger" through space. In this example, the robot uses input from pressure sensors via the task selector, to mark the final destination of the moving finger. For each initial location, the task selector selects the q final nodes associated with each pressure transducer. During the training process every q value associated with activation of a pressure sensor is a task initiating trigger that initiates the motion of the robotic finger towards the activated pressure transducer.

In a step 203, p cause vectors are calculated for each node of the nodal map. As the p vector values for each node are determined, they are expressed in a table such that there is one table per node. In a discrete nodal map, an estimated vector value may be assigned to each of the fixed number of p vectors assigned to each table. This vector value is determined by the control signal required for a robotic displacement to an adjacent node. For example, the dimensionality of the p vector may be determined by the number of joints and the number of degrees of freedom at each joint of the limb. The magnitude of the vector is determined by the motor torque-force required to move the limb to an adjacent node. For example, if a particular movement requires seven motors (with one degree of freedom per motor) then the p vector will be a 7 dimensional vector, and the magnitude of the vector will be determined by the 7 motor-torque-forces, required to move the robot to an adjacent node.

In a fully trained map, the number of p vectors at each node is determined by the dimensionality of the nodal space and the radius of action of each p vector. However, during the training process, the p field generator is programmed with a semi-random set of p values that cause a transition to the region of a desired q effect vector. The one p value that causes a precise transition to the desired q effect vector is selected by the training process.

In a step 204, effects that correspond to initial q effect vectors are monitored. The sequence of training is to associated particular input that validates a particular action with a final q effect node. For example, if a particular spatial transition reaches a termination point when a pressure sensor is activated, then input from that sensor is associated with a specific final q effect node.

Training starts with q initial nodes that are adjacent to the q final node. For example, if the q final node is a pressure transducer, training begins at all q initial nodes adjacent to the pressure transducer. Training proceeds systematically to q initial nodes that are further from the q final nodes. p values are determined for each node until a p value is determined for each and every q initial node, located in the vicinity of a particular q final node (i.e. pressure transducer). In the training of the self nodal map, this process is repeated for each and every pressure transducer (q final), located on the periphery of the robotic body, and for each and every initial node that can be occupied by the robotic finger. In each node, once the p values are determined, then throughout the operation of the robot, these p values remain unchanged. Training is complete when all possible q initial nodes of the self nodal map, have been trained. The accuracy of a particular robotic motion is confirmed if a pressure sensor is activated when the final node is reached.

In a step 205, the motion is confirmed when the nominal q-final effect vector that is generated by the task selector TIT approximates very closely the actual final q effect vector, as determined in step 206.

In a step 206, a line in a table associated with a node is selected so as to minimize the difference between the current q effect vector entry for that line and the q effect vector that is closest to the q final effects vector. If this difference is less than some predetermined nominal value, no update of the map is performed. If the difference is greater, the method proceeds at step 207.

In a step 207, the table associated with a node is updated by modifying the p value selected in step 203, and proceeding with steps 204 through 207.

Using the Self Nodal Map as a Recording Monitor

In the preferred embodiment, the self nodal map 112 is used as a recording monitor for the robot. The self nodal map 112 is related to all q fields of maps 110. For example the q visual field of map 110 may be recorded at the same nodal location as q tactile fields of map 112. In this way, a robot can simultaneously integrate visual data with tactile data and thereby monitor the visual data with respect to the tactile data.

In a fully trained system, all internal and external q field data are applied to a three dimensional nodal map that mirrors the Euclidean space surrounding a robot. The close relationship to the self tactile q field, of all external and internal sensory data is achieved by distributing the other sensory q fields onto nodes that are adjacent to the nodes of the self nodal map. For example, in a visual robot that uses a camera, there is an array of q field sensors that measure video content (image data) and an array that measures the tactile content (the camera's focal length, aperture and zoom position, and lens orientation). The image data q field is applied to the nodes of a 3 dimensional space that mirror the 3 dimensional Euclidean space surrounding the robotic body. Visual q field data that falls on the surface of the robotic body is applied to the same nodes that are assigned tactile pressure transducers, whereas the tactile content of the shown by the camera is located exactly at the surface location of pressure transducers assigned to the camera.

Additional inputs with a close relationship to the self tactile q field may include an array of auditory sensors consisting of small pick-up microphones. In such embodiments, the input from the vibrating diaphragm of each microphone is analogous to input from a pressure transducer sensor.

In a preferred embodiment, the tactile q field sensors distributed on the surface of the robotic body serve not only to form a differentiating boundary between the robot and the external environment, but also detect hard contacts that may be damage the robot. The early training of self nodal map involves utilization of hard contacts and associated high priority TITs that immediately initiate a task that is protective of the robot. In the preferred embodiment, the tactile q field sensors are constantly monitored at the frame rate of the robot. Any stimulation of a pressure transducer is detected (and recorded) on the self nodal map. This provides the robot with information relating to the location of the stimulation, as well as the location of the other parts of the robot (in particular, a robotic arm which can navigate to the stimulated region.). Thus, the self nodal map may be said to act as a "recorder" of tactile stimulation and can sense such stimulation relative to the robotic self.

In a preferred embodiment, sensory q field data (including sound information from microphones and optical data from cameras or light sensors) is applied to the same three dimensional nodal map upon which the tactile q field data is recorded. These sensors are constantly monitored at the frame rate of the robot while the robot performs its tasks. The early training of all nodal maps involves forecasting danger so as to cause TITs that immediately initiate a task that prevents hazards from endangering the robot. Any q field stimulation (visual, auditory, etc.) is detected (and recorded) on the self nodal map. This provides information relating to the location and magnitude of the stimulation, as well as the location of the other parts of the robot. For example, information may be used to cause the robotic arms and legs to navigate the robot to less dangerous spatial locations. Thus, the self nodal map may be said to act as a "recorder" of other q field stimulation (visual, auditory, etc.).

Using the Recording Monitor while Performing Other Tasks

A plurality of relational correlation sequencers can be coupled together so as to form an interactive hierarchy of information relating to the external environment of the robot, the self-location of the robot and the identification nodal map. This information is received from the internal and external sensors such as tactile sensors, optical sensors, auditory sensors, olfactory sensors, gustatory sensors, etc. In the preferred embodiment, all nodal maps associated with tasks that are performed relative to the primary task share the same 3 dimensional nodal space for the q field data.

However, the p field assigned to each node differs in different nodal maps. For example, the p field assigned to the primary self nodal map is the set of control vectors that navigate one part of the robot, for example a robotic finger, towards any other part, generally defined by a tactile sensor (pressure transducer). Other tasks, associated with other nodal maps, are assigned different p fields, however the q fields fall on the same nodes as the 3 dimensional nodal self map. For example, a task that requires control of robotic legs and makes use of visual camera data is associated with a nodal map wherein the q field sensory data falls on the same nodes as the self nodal map (a three dimensional nodal space that mirrors the space around the robot); however, the p vectors assigned to those nodes are the ones that control the legs as they perform a trained task.

The self nodal map operates simultaneously as other nodal maps perform other tasks. In this way, the self nodal map acts as a recording monitor and senses data relative to the self of the robot. This monitoring function is analogous to the biological monitoring associated with sensory "sensing" (such as "feeling, seeing, hearing, smelling and tasting") while performing other tasks.

Hierarchical Training

FIG. 3 is an exemplary hierarchical task diagram showing the elements of various tasks and a mechanism for decomposing a very conceptual task into constituent parts.

The sub-tasks at the bottom of the hierarchy are simple sequences of motor actions associated with line dances and daisy chains. These sub-tasks are elements of other slightly more complete tasks. For example, the mid-level task of directed walking can be decomposed in the daisy chain associated with the sub-task of stepping. The robot (and the associated nodal maps 110) are trained to perform the lower-level sub-tasks, along with the associated daisy chains and line dances prior to more advanced training.

After sufficient training, a robot may perform top level tasks. These tasks are denoted as "hierarchical prime tasks". Training for such tasks in shown in step 208 of FIG. 2. Hierarchical prime tasks can be initiated by search engines operating in conjunction with the self nodal map, as it performs a monitoring-recording function. Taken together, the search engine and self nodal map act as the task selector 150 and the TIT generator for tasks located below the hierarchical prime task in FIG. 3.

Different priority levels are associated with different tasks. These priority levels range from low level TITs to emergency TITs. Examples of stimuli to sensors that give rise to emergency TITs include the following:

Stimulation of tactile sensors (pressure transducers) indicative of a crash.

Stimulation of visual sensors corresponding to a sharp blinding light.

Stimulation of visual sensors corresponding to a fast moving object about to collide with the robot.

Stimulation of pick up microphones indicative of a loud, dangerous, ominous sound.

An internal malfunction that interferes with a hierarchical prime task.

Any stimulation that corresponds to a relatively serious threat of harm to the robot.

Emergency TITs and mid-level TITs can interrupt other lower level TITs. In the event that an emergency TIT triggers a hierarchical prime task, other tasks may stop. On the other hand, certain time-delayed emergency TITs (such as those corresponding to internal maintenance) do not interfere with hierarchical prime tasks immediately.

Examples of stimuli that give rise to mid-level TITs include stimuli from pressure transducers indicating that the exterior surface of the robot requires attention, or stimuli from visual sensor indicating insufficient light to implement a safe leg motion task. Under such conditions, the mid-level TITs causes lower priority tasks to cease until the condition that gave rise to the TIT is remedied.

In additional to priority levels, other related constraints on robotic action are determined by looking to which tasks can be simultaneously performed. For example, in FIG. 3, many tasks are broadly categorized as hierarchical prime tasks, leg motion tasks, hand manipulation and arm motion tasks, directed walking tasks, dancing tasks, destination tasks, and cyclic and non-cyclic stepping tasks. Although only one hierarchical prime task can be performed at a time, categories of tasks that are controlled by different motors can be performed simultaneously. For example, whereas leg motion tasks and hand manipulation tasks may occur simultaneously, only one cyclic chunking, destination, or orientation task can only be performed by the set of motors that control leg motion, or hand manipulation.

Additional Functionality

In some embodiments, the self nodal map can be used as a sound recording monitor. Such embodiments include an array of auditory sensors adjacent to the tactile sensors, such that the auditory sensors are sensitive to the sound spectral band of 20 to 20,000 cycles per second. In some embodiments, pressure transducers, may be situated immediately adjacent to each microphone so as to better relate the auditory signal to the robotic self. In such embodiments, q field sound data is displayed on the self nodal map and the robot monitors the sound relative to the self nodal mapping.

In addition to using nodal maps to store and interpret sounds, nodal maps can be used to generate meaningful sounds. FIGS. 4 and 5 relate to the generation of sounds. FIG. 4 shows a sequence of nodal transitions in the pq space where the p field is the sound generator and the q field provides a set of phonemes derived from the self nodal map. FIG. 5 shows a sequence of nodal transitions in the pq function space.

In FIG. 4, the p field is associated with sound generating control vector signals and the q field is associated with the phoneme sounds signals received by a set of microphones. In such embodiments, the p fields store a set of control signals that are used to generate a set of phonemes. Meaningful sounds can be generated by traversing the nodal map as shown in FIG. 5.

Generality of the Invention

The invention has general applicability to a number of robotic implementations and fields of use. Any mechanical devise that requires p signal controls to control any action whatsoever, can be enhanced by the use of a RRC as the control center, or brain of the device. All that is required is that sensors be added to the device to implement the prime self location and identification task, and support the designed p signal control tasks. A RRC controlled device senses and monitors the environment with respect to the self nodal map, and performs all p signal control tasks simultaneously.

For example, the mechanical device can be any motor controlled vehicle, such as a car, truck, airplane, tractor, crane, ditch digger, etc. or tool or implement such as a lathe, drill, and robotic welders and assemblers. For example, a car equipped with an RRC includes sensors necessary to implement the prime self location and identification task, and video camera visual sensors to support its navigational tasks. Such a car may be programmed as an autonomous taxi, robotically picking up passengers and driving them to their destination. A RRC controlled taxi senses and monitors the video camera visual data with respect to the self nodal map, and is therefore "self aware" of the visual data. This "self awareness" is analogous to a biological "seeing" capability. Such a robotic taxi is programmed to use the visual data to avoid damaging impacts that would be sensed by the tactile (pressure transducer) sensors, and to navigate safely to any and all locations as determined by a map stored in its memory nodal map.

A RRC may be used to control the p vectors of a robotic system that has an ambulatory (walking) capability, and manual dexterity capability. Such RRC controlled robots can be used to perform any task that requires manual dexterity manipulations, and/or locomotion, such as tasks performed by servants, and/or manual laborers. For example:

A mail delivery robot that walks from door to door delivering mail

A mail sorting robot that sorts mail for delivery

A ditch digging robot

A robot performing tasks of a cook, waiter, dishwasher, and bus boy for setting and cleaning tables A robot that performs any repetitive locomotion and manual dexterity task.

In addition, when a phoneme-sound generating, and auditory capability is coupled with a visual capability, an RRC controlled robot may achieve the high levels of intelligence that are associated with visualization and verbal communication. For example the robot may be trained to verbally identify the visual data that is presented to it. Subsequent training may involve using selected visual scenes as task initiating triggers to activate a verbal communication stream that describes the observed visual scene.

In addition, the robot may be trained to use the auditory sensory data as task initiating triggers that respond verbally to the auditory sensory data that is presented to it. This may give the robot an intelligent conversational capability that is analogous to human conversational intelligence.

Finally, a memory storage and retrieval relational correlation sequencer may be applied to the auditory-sound generating nodal maps of the RRC. This would involve using one or more nodal maps for verbal data storage (as shown in FIG. 3) and an associated sequence stepper for data retrieval; so as to verbalize the data stored in memory. In this case, the robot may be activated by a task initiating trigger, to verbally communicate data that may be stored in a memory or data that is received in real time, such as verbal auditory data or visual data. The RRC of such a robot may have a mechanical capability to "see, hear, speak and remember" the visual, auditory, and verbal data that it receives, as it performs the tasks that it is programmed to perform.

ALTERNATIVE EMBODIMENTS

Although preferred embodiments are disclosed herein, many variations are possible which remain within the concept, scope and spirit of the invention; these variations would be clear to those skilled in the art after perusal of this application.

What is claimed is:

1. An apparatus for teaching a device how to perform a second set of tasks based upon a related first set of tasks, including a set of nodal maps, including at least one self nodal map, wherein said nodal maps and said self nodal map are comprised of a set of cause vectors and effect vectors;

a task selector coupled to said set of nodal maps;

a sequencer coupled to said set of nodal maps, wherein said sequencer selects a sequence of said cause vectors used to navigate from said a first said effect vector to a second said effect vector; and a set of sensors.

2. An apparatus as in claim 1, wherein said apparatus generates a sequence of control vectors during each frame period such that said sequence is an "end point planning" process performed at the beginning of a task that is susceptible to change at anytime in the course of performance.

3. An apparatus as in claim 2, wherein the end point of said sequence is associated with the end point of said task.

4. An apparatus as in claim 1, wherein said set of sensors includes a set of pressure transducers and at least one of the following: a set of optical sensors, a set of microphones, a wet spectrometer and a dry spectrometer.

5. An apparatus as in claim 1, wherein said nodal maps included in said set of nodal maps are Kohonen self-organizing maps.

6. An apparatus as in claim 1, wherein said set of cause vectors is time invariant.

7. An apparatus as in claim 1, wherein said set of cause vectors are inputs to the motor controls of a robot.

8. An apparatus as in claim 1, wherein said set of nodal maps and said "self" nodal map mirror the three dimensional Euclidean space around said device.

9. An apparatus as in claim 1, wherein said sequencer is trained to navigate through said mirrored three dimensional space on the basis of field data from said effect vectors coupled to said mirrored three dimensional space.

10. An apparatus as in claim 1, wherein said self nodal map is used to record pressure transducer data during the performance of said second set of tasks.

11. An apparatus as in claim 1, wherein the self nodal map is used to record camera data, while said device is performing a second set of tasks.

12. An apparatus as in claim 1, wherein said self nodal map is used to record microphone data during performance of said second set of tasks.

13. An apparatus as in claim 1, wherein said set of nodal maps correspond to a multi-dimensional function space, wherein said functions are phonemes.

14. An apparatus as in claim 13, wherein said sequencer navigates through said multidimensional function space using sound field inputs.

15. An apparatus as in claim 1, wherein said self nodal map corresponds to data from a set of pressure transducers distributed on the peripheral surface of said device.

16. An apparatus as in claim 15, wherein said effect vector mapping of said data from said set of pressure transducers programs the self location.

17. An apparatus as in claim 1, wherein said self nodal map corresponds to data from one or more optical devices.

18. An apparatus as in claim 17, wherein said one or more optical devices include cameras.

19. An apparatus as in claim 1, wherein said self nodal map corresponds to a data from one or more auditory inputs.

20. An apparatus as in claim 19, wherein said one or more auditory inputs include one or more microphones.

21. An apparatus as in claim 1, including a means for updating said set of nodal maps.

22. An apparatus as in claim 1, including a task generator coupled to said set of nodal maps and said self nodal map.

23. An apparatus as in claim 22, wherein said task generator includes a hierarchical structure for assignment of priorities to tasks generated by said task generator.

24. A method for teaching a device how to perform a second set of tasks based upon a related first set of tasks, including receiving a first set of signals from at least one sensor;

mapping said signals on a nodal map included in a set of nodal maps, wherein said nodal map includes a set of cause vectors and effect vectors and at least one self nodal map;

updating said nodal map in response to information received from said sensor;

receiving a second set of signals from at least one sensor; and using information stored in said nodal map to generate a task trigger.

25. A method as in claim 24, wherein said step of receiving a first set of signals corresponds to the training of said nodal map.

26. A method as in claim 24, wherein said at least one sensor includes one or more of the following: an optical sensor, an auditory sensor, an olfactory sensor, a gustatory sensor and a tactile sensor.

27. A method as in claim 26, wherein said self nodal map records the data from said optical sensor.

28. An apparatus as in claim 26, wherein said one or more optical sensor includes cameras.

29. A method as in claim 26, wherein said "self" nodal map records the data from one or more auditory sensor.

30. A method as in claim 29, wherein said auditory sensor includes a microphones.

31. A method as in claim 24, wherein said step of mapping includes selecting a sequence of said cause vectors used to navigate from said a first said effect vector to a second said effect vector.

32. A method as in claim 24, wherein said self nodal map is used to record pressure transducer data during the performance of said second set of tasks.

33. A method as in claim 24, wherein said self nodal map is used to record camera data during the performance of said second set of tasks.

34. A method as in claim 24, wherein said self nodal map is used to record microphone data during the performance of said second set of tasks.

35. A method as in claim 24, wherein said set of nodal maps are Kohonen self-organizing maps.

36. A method as in claim 24, wherein, wherein said set of cause vectors is time invariant.

37. A method as in claim 24, wherein said set of cause vectors are inputs to the motor controls of a robot.

38. A method as in claim 24, wherein said self nodal map mirrors the three dimensional Euclidean space.

39. A method as in claim 24, wherein said set of nodal maps includes a multi-dimensional function space and said functions are phonemes.

40. A method as in claim 24, wherein said self nodal map includes data from a set of pressure transducers distributed on the peripheral surface of said device.

41. A method as in claim 40, wherein said effect vector mapping of said data from said of pressure transducers programs the self location.

42. A method as in claim 24, wherein said self nodal map corresponds to data from one or more optical devices.

43. A method as in claim 24, wherein said self nodal map corresponds to a data from one or more auditory inputs.

44. A method in claim 43, wherein said one or more auditory inputs include one or more microphones.

45. A method as in claim 43, wherein said effect vector mapping of said data from said set of pressure transducers programs the "self" location.

46. A method as in claim 24, wherein said step of mapping includes training a sequencer to navigate through a mirrored three dimensional space on the basis of q field data coupled to said mirrored three dimensional space.

47. A method as in claim 46, wherein said sequencer navigates through said multidimensional function space using sound field inputs.

48. A method as in claim 24, including a step of generating a hierarchy of tasks with associated priority levels.

* * * * *